T. J. MADIGAN.
COUPLING.
APPLICATION FILED AUG. 21, 1913.
1,126,056.
Patented Jan. 26, 1915.
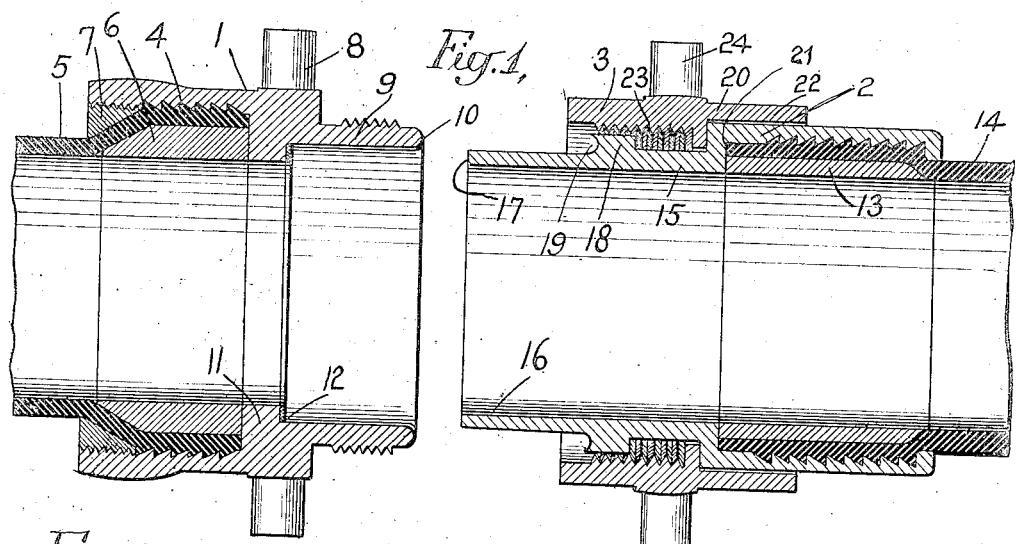
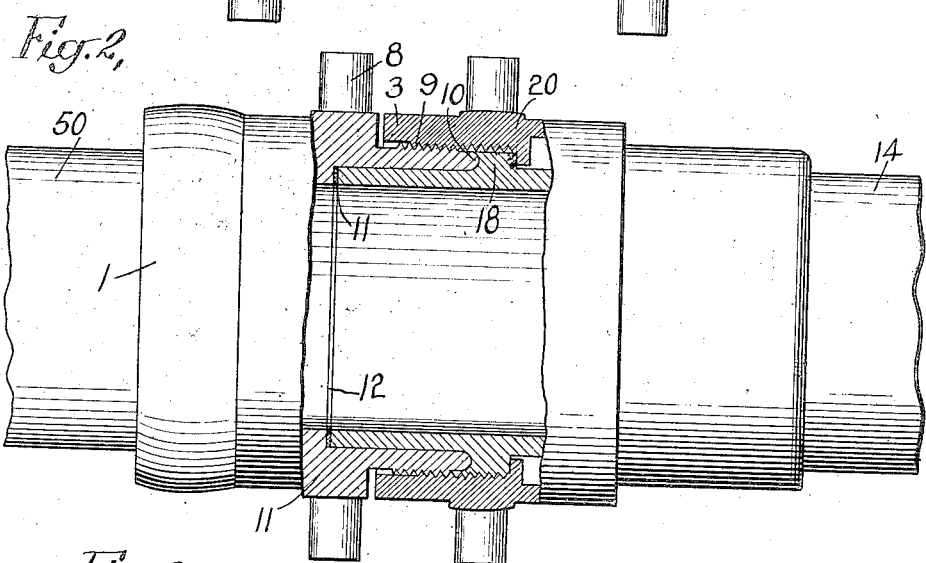
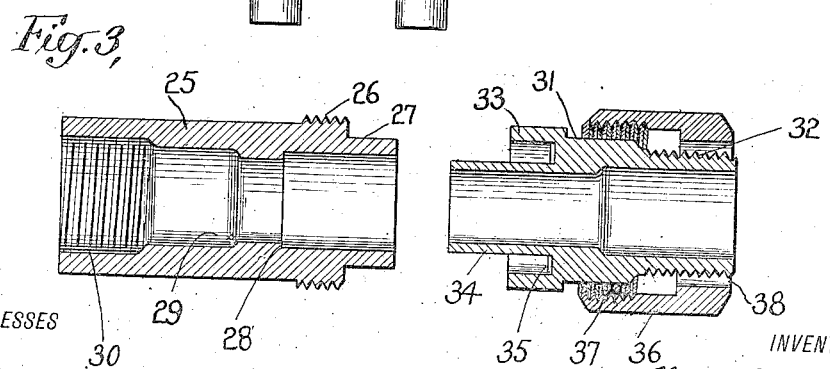
WITNESSES
L. Bates
C. B. Schreder
INVENTOR
Thomas J. Madigan
BY
Pennie Davis & Goldsborough
ATTORNEYS

UNITED STATES PATENT OFFICE.

THOMAS J. MADIGAN, OF NEW YORK, N. Y., ASSIGNOR TO MADIGAN MANUFACTURING COMPANY, INC., OF NEW YORK, N. Y. A CORPORATION OF NEW YORK.

COUPLING.

1,126,056.      Specification of Letters Patent.      Patented Jan. 26, 1915.

Application filed August 21, 1913. Serial No. 735,912.

*To all whom it may concern:*

Be it known that I, THOMAS J. MADIGAN, a citizen of the United States, residing in the city of New York, county and State of New York, have invented certain new and useful Improvements in Couplings; and I do hereby declare the following to be a full, clear, and exact description of the invention, such as will enable others skilled in the art to which it appertains to make and use the same.

In coupling together sections of fire hose, it is essential that the parts go together easily and quickly.

With couplings now in common use there is difficulty in alining the two members of the coupling preparatory to tightening up the collar, and this is particularly the case when the fire hose is of the standard large sizes and the connection is being made by but one man. If the parts are not in true alinement there is danger that the threads will not be in proper engagement at the start and that subsequent turning of the collar will strip or deform the threads. This deformation may happen even before the turning movement is begun and simply by jamming the parts together in an effort to bring them into proper alinement. With inaccuracy in the threads, such as might result from dropping the couplings on the pavement, and such as is very common with fire hose that has been used, the deformation, though slight, may be of such a character as to make it almost impossible for one man to hold the two members in proper register and then turn up the collar to clamp the parts together.

It is the object of the present invention to provide a coupling having means for alining the two members before the threaded parts come into engagement, the parts being so constructed that the two members can be telescoped together into final position with one part permanently seated within the other, without the danger of striking or jamming the threads and without the necessity for turning any threaded member. With the parts thus in their final position, the threaded collar can be turned up to clamp them in that position, thus insuring a water-tight connection and one so strong as to resist all of the strains of ordinary use.

Other objects and advantages of the present invention will be made clear by the following detailed description, which is to be taken in conjunction with the accompanying drawings, wherein:

Figure 1 is a sectional elevation through the coupling showing the parts presented ready for connection; Fig. 2 shows the coupling assembled, parts being broken away to disclose the interlocking relation of the two members; and Fig. 3 is a disassembled illustration of a modification showing the members in section.

In the construction illustrated in the drawings, the coupling includes socket members 1 and 2 and the threaded collar 3. Socket member 1 is provided with annular notches or recesses 4 forming a socket for the reception of the end of a length of fire hose 5, this end being clamped in place by an expanded ring 6 and locked by an annular collar 7 in threaded engagement with member 1. This arrangement insures a permanent fastening between the flexible hose and socket member 1. Socket member 1 carries a pair of wrench studs 8 and a nipple 9, the front edge 10 of which is rounded to form a smooth bearing surface for the purposes hereinafter explained. This nipple 9 is screw-threaded on the outside but the threads terminate a short distance in the rear of the rounded front edge 10 of the nipple. Positioned within socket member 1 somewhat in the rear of the screw-threads of the nipple, and preferably about in alinement with studs 8, is an annular boss 11, the interior diameter of which is substantially that of the hose 5 and the expanded ring 6, and the forward face of which carries a thin gasket 12 of lead or other suitable material serviceable to form a seat against which the other member of the coupling may be forced. Socket member 2 also carries an expander ring 13 for holding its length of fire hose 14 within the socket, but the central portion 15 of this member is devoid of screw-threads both inside and outside and is of a diameter substantially that of the expander ring 13 and hose 14, so that when the parts are assembled, as shown in Fig. 2, there will be through the coupling an opening of uniform bore through which water may be transmitted at high velocity without substantial impedance. Socket member 2 has its forward portion shaped to form a nipple 16 acting as a guiding sleeve by telescoping within nipple 9 of the other socket member. The forward end 17 of this guiding sleeve is cut straight across so that it can seat on the lead gasket 12 and form a water-tight joint throughout the entire circumference of the boss. Positioned between sleeve 16 and the central portion 15 of this socket member is an exterior boss 18 having its forward edge cupped to form an annular recess or socket 19, wherein the rounded front edge 10 of the other socket member may seat to form a close joint.

The ring member 3 encircles socket member 2 and has an inwardly extending boss 20, or a plurality of pins, lugs, or the like, which are fitted to the reduced central portion 15 of member 2, and which by striking against shoulder 21 limit the rearward movement of the ring or collar and by striking against boss 18 limit its forward movement. The rear or trailing portion 22 of this collar 3 slides freely back and forth over the tail of socket member 2 which affords a smooth bearing surface adapted to hold the threaded collar in proper alinement and to give it stability against lateral deflection while permitting ready movement toward and from the opposing member of the coupling. The screw-threads 23 with which collar 3 is provided, may extend from boss 20 almost to the forward edge of the collar. Wrench studs 24 are provided for easy manipulation of the collar.

To bring the members into locking engagement the operator first slides the threaded collar backward into its rearmost position, as shown in Fig. 1, and then brings the two members into alinement, as there shown, and then telescopes the guiding sleeve 16 into the nipple 9, until the forward end 17 of that sleeve reaches its seat on the lead gasket 12, simultaneously bringing the front edge 10 of nipple 9 into the annular recess or socket 19. All of this is done with the threaded collar 3 in its retracted position and presents no danger of jamming the threads of that collar or of nipple 9. With the socket members thus held in their final position and secured against displacement by the guiding sleeve 16, the operator may slide the threaded collar 3 down until it begins to take on the threads of nipple 9, with the assurance that the threads are in register and that a forcible advance of the collar will not strip any of the threads but will serve to correct such deformation, if any, as may have resulted from hard usage while the parts were disassembled. By making the boss 18 of proper width, the final position of threaded collar 3 will be such that boss 20 forms a close connection will boss 18, with the result that any leakage which might take place around the forward end 17 and up between the two nipples 9 and 16, will meet opposition not only because of the close fit between the front edge 10 and its socket 19, but because of the close fit between the two bosses 18 and 20, and its tortuous passage after leaving gasket 12 will be such that no great quantity of water could pass even though, through wear or other cause, the gasket 12 had ceased to afford a tight connection with the end 17 of the guiding sleeve.

A modification illustrated in Fig. 3 is particularly adapted for use in connecting together two metal pipes or tubes such, for instance, as are found in automobiles. The coupling in that figure comprises a socket member 25 having external screw-threads 26 and an off-set forming a nipple 27 Within the nipple and extending back beyond the threads is a cylindrical recess which terminates at an annular boss 28 serving as a seat for the reception of a part of the opposing member of the coupler. Rearwardly of this boss the member 25 increases in internal diameter at 29 and may be provided with internal screw-threads for the reception of the threaded end of a tube or pipe. The opposing member of the coupling of Fig. 3 is of cylindrical outline at 31, and may have its rear portion provided with screw-threads 32 for the reception of a threaded pipe or tube. Immediately in front of the cylindrical portion 31 is a nipple 33, and within this and spaced therefrom is a nipple 34 suitable for acting as a guiding sleeve and having an external diameter corresponding with the cylindrical opening through nipple 27, so that when the parts are telescoped together, sleeve 34 can slide through toward seat 28 and nipple 27 will advance into the annular space between nipples 33 and 34 in which it fits with a snug fit, until it seats permanently on a lead or other suitable gasket 35 at the bottom of that recess. There is also provided a threaded collar 36 having internal screw-threads 37 at its forward end, and having an internal flange 38 at its rear portion so disposed that when the collar is shoved forward over its corresponding coupling member, the flange will slide along over the cylindrical surface 31 until it strikes the shoulder at the rear of nipple 33, it being understood that this forward advancement is effected when the collar is screwed on to the threads 26 of the opposing member of the coupling.

In working with the construction just disclosed, it is possible to bring the two members into alinement and then shove them together into final position, the nipple 34 telescoping into the opposing nipple and the latter reaching its final seat on gasket 35 before collar 36 is shoved forward into engagement with threads 26. There is therefore no jamming of threads or distortion of threads due to rough handling, and with the parts in the position described, the collar will be in proper alinement and its forward advance will bring its threads in register with the coöperating threads on the other part. When the joint is completed there is a tight connection not only at gasket 35 but there is a close fit along the inner face of nipple 33 and along the outer face of nipple 34, and there may even be provided a close joint at shoulder 28, so that even in case of wear at the gasket 35, or other imperfection in the fit at that gasket, no great quantity of leakage can occur through the coupling.

I claim:

1. In a coupling, the combination of a pair of socket members adapted for attachment to tubular members, a nipple seat in each socket member, nipples on said members adapted to slidingly telescope together until they meet said seats when said members are advanced into coupled relation, and a threaded collar movable forward after said members are in coupled relation to secure said members against separation.

2. In a coupling, the combination of a pair of socket members having means for attachment to hose ends, and a threaded collar slidingly mounted on one of said members, a nipple on each of said members, seats for the ends of said nipples, said nipples being positioned to slidingly telescope one within the other until they take on said seats when the parts are pushed together, and being capable of advancement into final position without movement of the threaded collar, and one of the nipples being provided with screw-threads for engagement with the collar when the latter is advanced to secure said members against withdrawal from one another.

3. In a coupling, a socket member having a nipple provided on its exterior with screw-threads, said nipple having a smooth cylindrical bore terminating in an annular boss, a gasket on said boss, a second socket member provided with a nipple shaped to slidingly telescope within the threaded nipple and to seat on said gasket, and a threaded collar positioned on said second member and slidingly mounted thereon for advancement into engagement with the threaded nipple after said members have been completely telescoped together.

4. In a coupling of the character described, the combination of a socket member bearing external screw-threads and having a nipple with a smooth cylindrical recess extending through said nipple beyond said threads, an opposing socket member bearing a nipple adapted to slidingly telescope within the nipple first mentioned and insuring proper alinement of the two socket members as they are advanced into coupled relation, and a threaded collar slidingly mounted on the second socket member and adapted for engagement with the threads on the first socket member only after the socket members have been completely telescoped together, said collar serving to lock the socket members in telescoped relation.

5. In a coupling, the combination of a socket member having an end portion exteriorly threaded and having the threaded portion of uniform bore, and a second socket member having a smooth guiding portion adapted to pass through the internally threaded portion of the first member and to snugly fit therein, compelling proper alinement of the two socket members during their sliding advancement into coupled relation, and an internally threaded member positioned on said second socket member provided with screw-threads for engagement with the threads on the first socket member, said threaded member being slidingly mounted so that its thread need not come into register with the coöperating threads on the opposing member until after the socket members have been guided into substantially their final telescoped relation.

In testimony whereof I affix my signature, in presence of two witnesses.

THOS. J. MADIGAN.

Witnesses:
  WM. H. HANFORD,
  WILLIAM H. DAVIS.